United States Patent
Sung et al.

(10) Patent No.: US 11,075,403 B2
(45) Date of Patent: Jul. 27, 2021

(54) GARNET POWDER, MANUFACTURING METHOD THEREOF, SOLID ELECTROLYTE SHEET USING HOT PRESS AND MANUFACTURING METHOD THEREOF

(71) Applicants: HYUNDAI MOTOR COMPANY, Seoul (KR); KIA MOTORS CORPORATION, Seoul (KR)

(72) Inventors: Ju Young Sung, Suwon-si (KR); Ho Taek Lee, Seoul (KR); Eun Ji Kwon, Yongin-si (KR); Yong Jun Jang, Seongnam-si (KR); Ji Na Kim, Gunpo-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 186 days.

(21) Appl. No.: 16/000,703

(22) Filed: Jun. 5, 2018

(65) Prior Publication Data
US 2018/0294519 A1    Oct. 11, 2018

Related U.S. Application Data

(62) Division of application No. 14/716,491, filed on May 19, 2015, now Pat. No. 10,008,740.

(30) Foreign Application Priority Data

Aug. 18, 2014 (KR) .................. 10-2014-0106858

(51) Int. Cl.
| | | |
|---|---|---|
| H01M 10/00 | (2006.01) | |
| H01M 10/0562 | (2010.01) | |
| H01M 10/0525 | (2010.01) | |
| C01B 33/26 | (2006.01) | |

(52) U.S. Cl.
CPC ......... *H01M 10/0562* (2013.01); *C01B 33/26* (2013.01); *H01M 10/0525* (2013.01); *H01M 2300/0071* (2013.01)

(58) Field of Classification Search
CPC ......... H01M 10/0562; H01M 10/0525; H01M 10/052; H01M 2300/0071; H01M 2300/0074; H01M 2300/0077; C01D 15/02; C01F 17/0012; C01F 17/0018; C01G 25/006
USPC ........ 423/21.1, 263; 264/674, 614, 618, 620
See application file for complete search history.

(56) References Cited

U.S. PATENT DOCUMENTS

| | | | |
|---|---|---|---|
| 10,008,742 B2 * | 6/2018 | Holme | ................ C04B 35/6261 |
| 2010/0047696 A1 | 2/2010 | Yoshida et al. | |
| 2010/0203383 A1 * | 8/2010 | Weppner | .............. C01G 25/006 |
| | | | 429/209 |
| 2013/0084505 A1 | 4/2013 | Iriyama et al. | |
| 2013/0344416 A1 | 12/2013 | Sakamoto et al. | |
| 2014/0295287 A1 | 10/2014 | Eisele et al. | |
| 2015/0099188 A1 | 4/2015 | Holme et al. | |
| 2015/0171463 A1 | 6/2015 | Liang et al. | |
| 2015/0349376 A1 | 12/2015 | Shin et al. | |
| 2016/0149260 A1 | 5/2016 | Badding et al. | |
| 2017/0062873 A1 | 3/2017 | Iyer et al. | |
| 2017/0263976 A1 | 9/2017 | Choi et al. | |

FOREIGN PATENT DOCUMENTS

| | | |
|---|---|---|
| KR | 2010-0053543 A | 5/2010 |
| KR | 10-2014-0005393 A | 1/2014 |
| KR | 10-1375148 B1 | 3/2014 |

OTHER PUBLICATIONS

Ni, et al, "Room temperature elastic moduli . . . cubic garnet" J. Mater. Sci. 47:7978-85, Jul. 2012 (Year: 2012).*
David, et al, "Microstructure and Li-ion conductivity . . . " J. Am. Ceram. Soc. 98 [4] 1209-14, Apr. 2015. (Year: 2015).*
Rangasamy et al, "The role of Al and Li concentration . . . " Solid State Ionics, 206, 28-32, Nov. 2011. (Year: 2011).*
U.S. Notice of Allowance dated Feb. 28, 2018 issued in U.S. Appl. No. 14/716,491.
U.S. Non-Final Office Action dated Oct. 5, 2017 issued in U.S. Appl. No. 14/716,491.
Jeff Wolfenstine et al., "High conductivity of dense tetragonal Li7La3Zr2O12", Journal of Power Sources, 208 (2012), pp. 193-196.
J.L. Allen et al., "Effect of substitution (Ta, Al, Ga) on the conductivity of Li7La3Zr2O12", Journal of Power Sources 206 (2012) pp. 315-319.
Ezhiyl Rangasamy et al., "The role of Al and Li concentration on the formation of cubic garnet solid electrolyte of nominal composition Li7La3Zr2O12", Solid State Ionics 206 (2012) pp. 28-32.

* cited by examiner

*Primary Examiner* — Steven J Bos
(74) *Attorney, Agent, or Firm* — Morgan, Lewis & Bockius LLP (57) ABSTRACT

The present disclosure relates to garnet powder, a manufacturing method thereof, a solid electrolyte sheet using a hot press, and a manufacturing method thereof. In particular, the present disclosure provides a method for manufacturing $Li_7La_3Zr_2O_{12}$ (LLZ) garnet powder including preparing a mixture by first dry mixing $Li_2CO_3$, $La_2O_3$, $ZrO_2$, and $Al_2O_3$. The mixture is first calcinated for 5 to 7 hours in a temperature range of 800 to 1000° C. The calcinated mixture is ground to a powder with an average particle size of 1 to 4 μm through dry grinding. A cubic-phased LLZ garnet powder is prepared by second calcinating the ground mixture for 10 to 30 hours in a temperature range of 1100 to 1300° C.

4 Claims, 10 Drawing Sheets

EXAMPLE 2

COMPARATIVE EXAMPLE 5

FIG.7C

COMPARATIVE EXAMPLE 4 (HOT PRESS 900°C)

FIG. 8A

COMPARATIVE
EXAMPLE 5
(HOT PRESS 1000°C)

FIG. 8B

EXAMPLE 2
(HOT PRESS 1100°C)

FIG. 8C

GARNET POWDER, MANUFACTURING METHOD THEREOF, SOLID ELECTROLYTE SHEET USING HOT PRESS AND MANUFACTURING METHOD THEREOF

CROSS-REFERENCE TO RELATED APPLICATION

This application is a divisional patent application of U.S. patent application Ser. No. 14/716,491, filed on May 19, 2015, which claims under 35 U.S.C. § 119(a) the benefit of Korean Patent Application No. 10-2014-0106858 filed on Aug. 18, 2014, the entire contents of which are incorporated herein by reference.

TECHNICAL FIELD

The present disclosure relates to garnet powder, a manufacturing method thereof, a solid electrolyte sheet using a hot press and a manufacturing method thereof, and in particular, to garnet powder in which the garnet powder is obtained in high yields compared to existing garnet pellets having a very small amount of LLZ ($Li_7La_3Zr_2O_{12}$) garnet powder, and a solid electrolyte sheet using this garnet powder has a pure cubic-phased crystal structure without impurities by using a hot press process, and is effective in improving ionic conductivity compared to existing solid electrolytes, a manufacturing method of the garnet powder, a solid electrolyte sheet using a hot press, and a manufacturing method of the solid electrolyte sheet.

BACKGROUND

Secondary batteries are batteries that undergo repeated charging and discharging by chemical energy and electric energy being interconverted through the chemical reactions of oxidation and reduction. Secondary batteries generally include four basic elements: an anode, a cathode, a separator, and an electrolyte. Herein, the anode and the cathode are collectively referred to as an electrode, and among the elements forming electrode materials, a material causing the actual reaction is referred to as an active material.

Generally, lithium ion secondary batteries use a liquid electrolyte and an electrolyte including a liquid. However, liquid electrolytes have disadvantages in that they are volatile, and therefore, may present an explosion hazard. In addition, the liquid electrolytes have inferior thermal stability.

Meanwhile, solid state batteries using a solid state electrolyte have low danger of explosion, and also have excellent thermal stability. In addition, when a bi-polar plate is used, high operating voltage may be obtained by a series connection through electrode lamination, and in this case, higher energy density may be obtained compared to the energy density in a series connection mode of cells using a liquid electrolyte.

In order to prepare such an all solid state battery, a solid electrolyte transferring lithium ions is necessary. Solid electrolytes are largely divided into an organic (polymer) electrolyte and an inorganic electrolyte. The inorganic electrolyte is further divided into an oxide-type electrolyte and a sulfide-type electrolyte.

Of these, the oxide-type solid electrolyte is an oxygen-including electrolyte, such as a LiPON-type, a perovskite-type, a garnet-type and a glass ceramic-type. Oxide-type solid electrolytes have an ionic conductivity of $10^{-5}$ to $10^{-3}$ S/cm lower than sulfide-based electrolytes. The oxide-type solid electrolyte, however, has advantages in that the oxide-type solid electrolyte is stable with respect to moisture and the reactivity in the atmosphere due to oxygen is low, as compared to the sulfide-type solid electrolyte.

The oxide-based solid electrolyte has high grain boundary resistance, and therefore, an electrolyte membrane or pellets, in which necking between the particles are formed from high temperature sintering, may be used, and there is a problem in that mass productivity is very low to form a large-area electrolyte membrane since high temperature sintering is carried out at a temperature of 900 to 1400° C.

Particularly, a garnet-type solid electrolyte requires a long time of 6 hours or longer at a high temperature of 1000 to 1200° C. in final calcination, and in order to prevent lithium volatilization, and to secure phase changes and composition uniformity, pellet-covered garnet may be used. However, there is a disadvantage in that the proportion of garnet secured using such pellets is usually less than 20% by weight with respect to the total weight, which is a very small amount.

The US Patent Application Publication No. 2013-0344416 discloses solid oxide ceramics prepared by hot pressing pellets that are prepared including lithium carbonate, lanthanum hydroxide, zirconium oxide, and alumina; however, there is a disadvantage in that pellet-type LLZ with low crystallizability is formed.

Accordingly, in order to secure a large amount of garnet powder, much research has been conducted, including basic physical property studies, preparation of garnet sheet, preparation of a complex solid electrolyte of garnet and polymers, and studies on the materials capable of being utilized in the manufacturing process of all solid state batteries.

The above information disclosed in this Background section is only for enhancement of understanding of the background of the invention and therefore it may contain information that does not form the prior art that is already known in this country to a person of ordinary skill in the art.

SUMMARY

The present disclosure has been made in an effort to solve the above-described problems associated with the prior art. The inventors of the present disclosure have found that garnet powder may have a pure cubic-phased crystal structure with high crystallizability while being produced in a higher yield. By manufacturing a solid electrolyte sheet using this garnet powder through a hot press process, the solid electrolyte sheet may have improved ionic conductivity compared to existing solid electrolytes. Accordingly, in an embodiment of the present disclosure a garnet powder having a cubic-phased crystal structure is provided.

In another embodiment of the present disclosure a method for manufacturing the garnet powder in an improved yield compared to existing garnet pellets is provided.

In another embodiment of the present disclosure a solid electrolyte sheet including the garnet powder, which has improved ionic conductivity, is provided.

In another embodiment of the present disclosure a method for manufacturing the solid electrolyte sheet using a hot press is provided.

Another embodiment of the present disclosure provides LLZ ($Li_7La_3Zr_2O_{12}$) garnet powder having a cubic-phased crystal structure, wherein a molar ratio of the Li:La:Zr atoms is 6.5 to 8.3 mol:3 mol:2 mol.

In another embodiment, the present disclosure provides a method for manufacturing LLZ ($Li_7La_3Zr_2O_{12}$) garnet powder including preparing a mixture by first dry mixing $Li_2CO_3$, $La_2O_3$, $ZrO_2$, and $Al_2O_3$; and the mixture is first calcinated for 5 to 7 hours in a temperature range of 800 to 1000° C. The calcinated mixture is ground to a powder size of 1 to 4 μm through dry grinding. A cubic-phase LLZ ($Li_7La_3Zr_2O_{12}$) garnet powder is prepared by second calcinating the ground mixture for 10 to 30 hours in a temperature range of 1100 to 1300° C.

In another embodiment, the present disclosure provides a solid electrolyte sheet including the LLZ ($Li_7La_3Zr_2O_{12}$) garnet powder.

In a further embodiment, the present disclosure provides a method for manufacturing a solid electrolyte sheet using a hot press including preparing the LLZ ($Li_7La_3Zr_2O_{12}$) garnet powder; and manufacturing a solid electrolyte sheet by hot pressing the garnet powder for 30 minutes to 2 hours in a temperature range of 1050 to 1250° C. under an argon atmosphere.

Other aspects and embodiments of the invention are discussed infra.

LLZ ($Li_7La_3Zr_2O_{12}$) garnet powder according to the present disclosure is prepared through a two-step calcination processes as a powder itself. As a result, the obtained garnet powder content is high compared to existing garnet pellets having a very small amount of garnet powder, and the prepared LLZ garnet powder has a cubic-phased crystal structure with high crystallizability.

In addition, a solid electrolyte sheet including the LLZ ($Li_7La_3Zr_2O_{12}$) garnet powder according to the present disclosure uses a hot press process, therefore, a solid electrolyte sheet having a pure cubic-phased crystal structure may be manufactured without including impurities, and the solid electrolyte sheet is effective in improving ionic conductivity compared to existing solid electrolytes.

BRIEF DESCRIPTION OF THE DRAWINGS

The above and other features of the present disclosure will now be described in detail with reference to certain exemplary embodiments thereof illustrated in the accompanying drawings which are given hereinbelow by way of illustration only, and thus are not limitative of the present disclosure.

It should be understood that the appended drawings are not necessarily to scale, presenting a somewhat simplified representation of various preferred features illustrative of the basic principles of the invention. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

Hereinafter reference will now be made in detail to various embodiments of the present disclosure, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

The present disclosure provides LLZ ($Li_7La_3Zr_2O_{12}$) garnet powder having a cubic-phased crystal structure in which the molar ratio of the Li:La:Zr atoms is 6.5 to 8.3:3:2.

The LLZ ($Li_7La_3Zr_2O_{12}$) garnet powder is divided into cubic-phased or tetragonal-phased, and herein, the cubic-phased is reported to have excellent ionic conductivity of 100 times or higher with the cubic-phased having ionic conductivity of approximately $10^{-4}$ S/cm and the tetragonal-phased having ionic conductivity of approximately $10^{-6}$ S/cm. Accordingly, synthesizing to have a cubic-phased crystal structure instead of impurities, secondary-phased or tetragonal-phased is advantageous in improving the physical properties.

In embodiments of the LLZ garnet powder, the molar ratio of the Li atom ranges from 6.5 to 8.3 mol. When the molar ratio is less than 6.5 mol, garnet powder having a cubic-phased crystal structure is not produced, and when the molar ratio is greater than 8.3 mol, there is a problem in that ionic conductivity rapidly decreases due to the presence of impurities. Generally, Li volatilization most actively occurs at a temperature of approximately 900° C. or higher, therefore, the Li atom may be used in greater than 10 mol %. In a certain embodiment, the molar ratio of the Li:La:Zr atoms is preferably 7:3:2.

In certain embodiments, some of the Li of the LLZ garnet powder may be substituted with Al. Herein, the Al stabilizes the cubic-phased crystal structure and affects the density increase with a liquid phase sintering effect, and may improve the ionic conductivity of the powder. Consequently, some of the Li may be substituted with Al in the synthesis.

The Al may be substituted in a range of 0.02 to 1.075 mol. The Al may be doped in the form of $Al_2O_3$ at 0.1 to 5% by weight with respect to the LLZ. Specifically, when the $Al_2O_3$ is doped in less than 0.1% by weight, physical properties of a solid electrolyte may be degraded, and when in doped greater than 5% by weight, there is a problem in that impurities ($Al_3Zr$, $Li_2ZrO_3$) are produced with the cubic-phased powder. In a certain embodiment, the $Al_2O_3$ is doped at 3.69% by weight.

In addition, the present disclosure provides a method for manufacturing LLZ ($Li_7La_3Zr_2O_{12}$) garnet powder including preparing a mixture by first dry mixing $Li_2CO_3$, $La_2O_3$, $ZrO_2$, and $Al_2O_3$. The mixture is first calcinated for 5 to 7 hours in a temperature range of 800 to 1000° C. The calcinated mixture is ground to a powder with an average particle size of 1 to 4 µm through dry grinding. The cubic-phased LLZ ($Li_7La_3Zr_2O_{12}$) garnet powder is prepared by second calcinating the grinded mixture for 10 to 30 hours in a temperature range of 1100 to 1300° C.

The operation of preparing a mixture by first dry mixing is an operation of simply mixing raw material powders, and no energy is transferred to the powders in the process. There may be a 5 minute rest time in each step to prevent the transfer of heat energy into the powders. The mixing method includes a dry method or a wet method. Dry mixing using a planetary mill owned by the inventors may be carried out since, in the case of wet mixing, the process time may increase, (such as by one day or more to dry the mixture) and side reactions due to solvents may occur. As the mixing condition, the planetary milling condition is milder, and the number of zirconia balls may be approximately half when compared to the two-step dry mixing.

In the LLZ garnet powder, the molar ratio of the $Li_2CO_3$, $La_2O_3$, $ZrO_2$, and $Al_2O_3$ is 6.5 to 8.3 mol:3 mol:4 mol 0.02 to 1.075 mol.

In the LLZ garnet powder, some of the Li may be substituted with Al. The substituted Al may be $Al_2O_3$ being doped in 0.1 to 5% by weight with respect to the LLZ.

The operation of first calcinating the mixture may be carried out for 5 to 7 hours in a temperature range of 800 to 1000° C. In this operation, $CO_2$ and $H_2O$ residues present inside the mixture powder are removed. Particularly, when a carbonic acid component of the $Li_2CO_3$ is not removed, the carbonic acid component remains inside the LLZ garnet powder, and becomes a factor causing a decrease of density and ionic conductivity, therefore, $CO_2$ needs to be removed. Calcination may be carried out for 6 hours at 900° C.

In the operation of grinding the calcinated mixture to a powder size of 1 to 4 µm through dry grinding, some of the calcinated mixture may be firmly aggregated, and some may experience a phase shift of the garnet structure. Consequently, when performing the final calcination process, milling may be carried out under a mixing condition stronger than the first calcination step in order to simultaneously have the crushing of the aggregated powder and the powder mixing for maximizing the reaction, and the number of zirconia balls may be approximately twice compared to the first calcination step.

In the operation of preparing cubic-phased LLZ ($Li_7La_3Zr_2O_{12}$) garnet powder by second calcinating the grinded mixture for 10 to 30 hours in a temperature range of 1100 to 1300° C., the temperature and the time for producing the LLZ garnet powder may be different depending on the composition of the raw materials. Particularly, in the case of the raw materials including hydroxide, the operation may be carried out in a low temperature range of 50 to 100° C.

The method for manufacturing the LLZ garnet powder may further include an operation of analyzing the LLZ garnet powder, and the analysis may be carried out using X-Ray Diffraction (XRD), Raman Spectroscopy, or Inductively Coupled Plasma Mass Spectrometry (ICP-MS). The XRD may identify the LLZ phase and impurities, and through the Raman, phases and impurities corresponding to regions having hundreds of micrometers or less, which are difficult to be determined with XRD, may be identified. In addition, using ICP, differences between target compositions and synthesized compositions may be compared by identifying the ratio of each atom composition in the LLZ.

In addition, the present disclosure provides a solid electrolyte sheet including the LLZ ($Li_7La_3Zr_2O_{12}$) garnet powder. The solid electrolyte sheet may have a pure cubic-phased crystal structure without including impurities, and have improved ionic conductivity as a solid electrolyte sheet in a powder phase compared to existing solid electrolytes in a pellet phase.

In addition, the present disclosure provides a method for manufacturing a solid electrolyte sheet using a hot press including preparing the LLZ ($Li_7La_3Zr_2O_{12}$) garnet powder; and manufacturing a solid electrolyte sheet by hot pressing the garnet powder for 30 minutes to 2 hours in a temperature range of 1050 to 1250° C. under argon atmosphere.

In the operation of manufacturing a solid electrolyte sheet using a hot press, when the temperature is lower than 1050° C., a tetragonal phase that is produced advantageously at low temperature may be formed, and when the temperature is higher than 1250° C., an impurity phase such as pyrochlore ($La_2Zr_2O_7$) may be formed, or melting of the garnet powder may occur.

The solid electrolyte sheet may have a thickness of 0.01 to 5 mm. Specifically, when the thickness of the solid electrolyte sheet is less than 0.01 mm, cracks or fractures may occur due to the weak physical properties, and when greater than 5 mm, the energy density of a battery cell may greatly decrease due to the weight of the solid electrolyte.

In the solid electrolyte sheet, almost 100% of the powder used may be manufactured to a sheet, and the solid electrolyte sheet has ionic conductivity ranging from $6 \times 10^{-4}$ to $10 \times 10^{-4}$ S/cm.

The method for manufacturing the solid electrolyte sheet may further include an operation of analyzing the solid electrolyte sheet, and the analysis may be carried out using X-Ray Diffraction (XRD), Raman Spectroscopy, or Inductively Coupled Plasma Mass Spectrometry (ICP-MS).

Consequently, the garnet powder according to the present disclosure may be prepared as powder through a two-step calcination process. Therefore, the obtained content of the garnet powder is high compared to existing garnet pellets including a very small amount of garnet powder, and the prepared garnet powder has a cubic-phased crystal structure with high crystallizability.

In addition, the solid electrolyte sheet including the LLZ ($Li_7La_3Zr_2O_{12}$) garnet powder according to the present disclosure may use a hot press process. Therefore, a solid electrolyte sheet having a pure cubic-phased crystal structure may be manufactured without including impurities, and the solid electrolyte sheet is effective in improving ionic conductivity compared to existing solid electrolytes.

The hot press process may include hot pressing the garnet powder for 30 minutes to 2 hours in a temperature range of 1050 to 1250° C. under an oxygen free atmosphere.

EXAMPLES

Hereinafter, the present disclosure will be described in more detail with reference to examples, however, the scope of the present disclosure is not limited to the following examples.

Manufacture of Garnet Powder

Example 1

A mixture was prepared by first dry mixing $Li_2CO_3$, $La_2O_3$, $ZrO_2$ and $Al_2O_3$, which are raw materials, in a molar ratio of 7.7:3:4:0.5. Next, the mixture was first calcinated for 6 hours at 900° C., and then the powder was ground to an average particle size of 1 to 4 µm. The ground mixture was second calcinated for 20 hours at 1200° C., and cubic-phased LLZ ($Li_7La_3Zr_2O_{12}$) garnet powder was obtained.

Comparative Example 1

LLZ ($Li_7La_3Zr_2O_{12}$) garnet powder was obtained by grinding and calcinating a mixture in the same manner as in Example 1 except that the mixture was prepared by first dry mixing LiOH, $La_2O_3$, $ZrO_2$, and $Al_2O_3$, which are raw materials, in a molar ratio of 15.4:3:4:0.5.

Comparative Example 2

LLZ ($Li_7La_3Zr_2O_{12}$) garnet powder was obtained by grinding and calcinating a mixture in the same manner as in Example 1 except that the mixture was prepared by first dry mixing LiOH, $La(OH)_3$, $ZrO_2$, and $Al_2O_3$, which are raw materials, in a molar ratio of 15.4:6:4:0.5.

Comparative Example 3

LLZ ($Li_7La_3Zr_2O_{12}$) garnet powder was obtained by grinding and calcinating a mixture in the same manner as in Example 1 except that the mixture was prepared by first dry mixing $Li_2CO_3$, $La(OH)_3$, $ZrO_2$, and $Al_2O_3$, which are raw materials, in a molar ratio of 7.7:6:4:0.5.

Manufacture of Solid Electrolyte Sheet

Example 2

A solid electrolyte sheet was manufactured by hot pressing the cubic-phased LLZ ($Li_7La_3Zr_2O_{12}$) garnet powder manufactured in Example 1 for 1 hour at a temperature of 1100° C. under argon (Ar) atmosphere. Herein, the process was carried out under a pressure of 50 MPa, and the solid electrolyte sheet was manufactured to a thickness of 5 mm and a size of 30×30 $mm^2$.

Comparative Example 4

A solid electrolyte sheet was manufactured in the same manner as in Example 2 except that the cubic-phased LLZ ($Li_7La_3Zr_2O_{12}$) garnet powder manufactured in Example 1 was hot pressed for 1 hour at a temperature of 900° C. under argon (Ar) atmosphere.

Comparative Example 5

A solid electrolyte sheet was manufactured in the same manner as in Example 2 except that the cubic-phased LLZ ($Li_7La_3Zr_2O_{12}$) garnet powder manufactured in Example 1 was hot pressed for 1 hour at a temperature of 1000° C. under argon (Ar) atmosphere.

Comparative Example 6

A solid electrolyte sheet was manufactured by preparing LLZ ($Li_7La_3Zr_2O_{12}$) garnet pellets using a general process, and then calcinating the pellets again. In the solid electrolyte sheet, the garnet pellets were prepared by being first calcinated for 6 hours at a temperature of 900° C. and then applying a pressure of 130 MPa thereto, and then the solid electrolyte sheet was manufactured by second calcinating the pellets again for 20 hours at a temperature of 1200° C.

Test Example 1: X-Ray Diffraction (XRD) Measurements of Garnet Powder Manufactured in Example 1 and Comparative Examples 1 to 3

Figure 1:
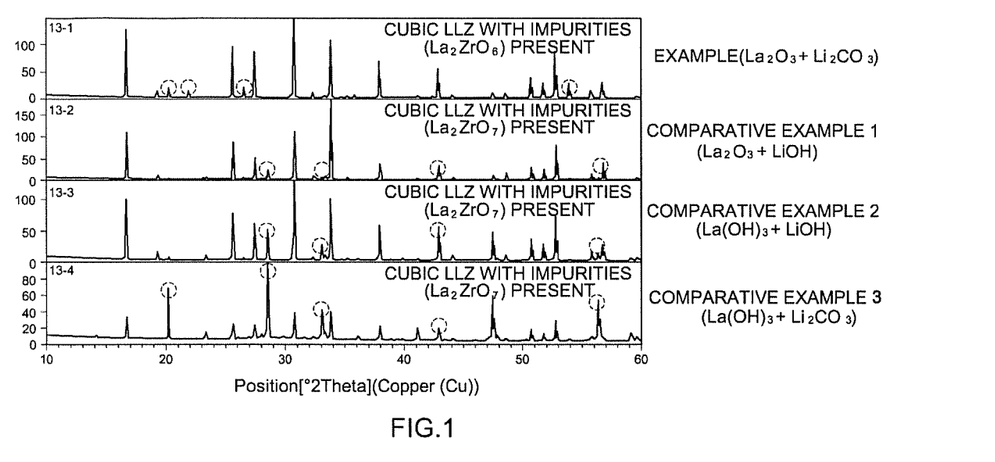
FIG. 1 illustrates XRD measurement results of garnet powder manufactured in Example 1 and Comparative Examples 1 to 3 of the present disclosure.

In order to identify the composition and the crystallizability of the garnet powder manufactured in Example 1 and Comparative Examples 1 to 3, peaks were analyzed using an XRD device, and the results are shown in FIG. 1.

FIG. 1 shows the XRD measurement results of the garnet powder manufactured in Example 1 and Comparative Examples 1 to 3. As identified in FIG. 1, impurities were observed in all the garnet powder manufactured in Example 1 and Comparative Examples 1 to 3, however, it was seen that the amount of the impurities is small in the examples considering the small impurity peaks observed in the examples including $La_2O_3$, compared to Comparative Examples 2 and 3 including $La(OH)_3$ in which relatively large impurity peaks were observed.

Test Example 2: Raman Spectroscopy Measurements of Garnet Powder Manufactured in Example 1 and Comparative Examples 1 to 3

In order to identify the crystal phase and the impurities of the garnet powder manufactured in Example 1 and Comparative Examples 1 to 3, peaks were analyzed using a Raman Spectroscopy device, and the results are shown in FIGS. 2A to 2D.

Figure 2A:
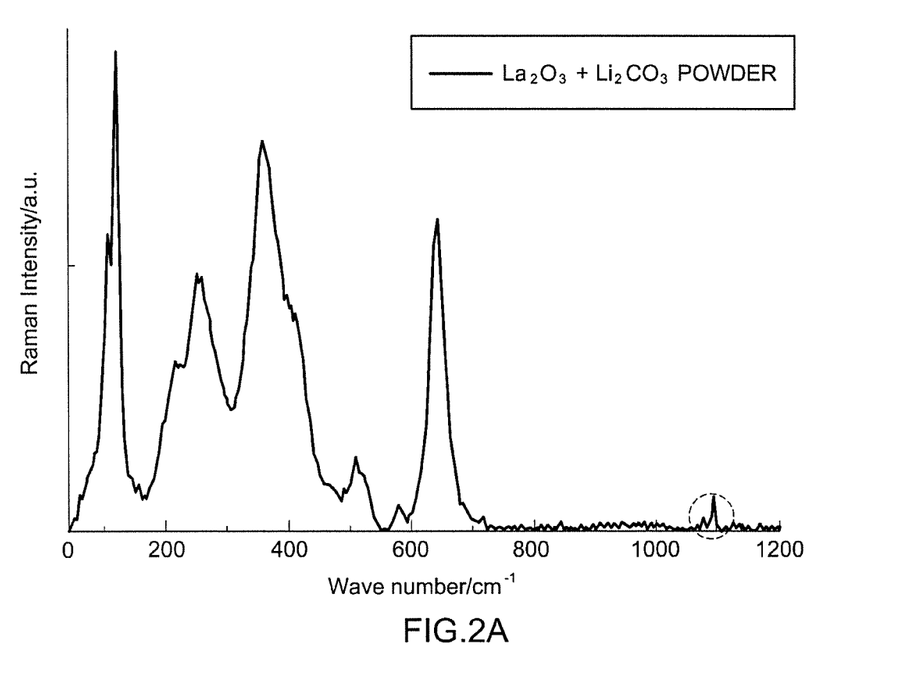
FIG. 2A is a Raman measurement result of garnet powder manufactured in Example 1 of the present disclosure.
Figure 2B:
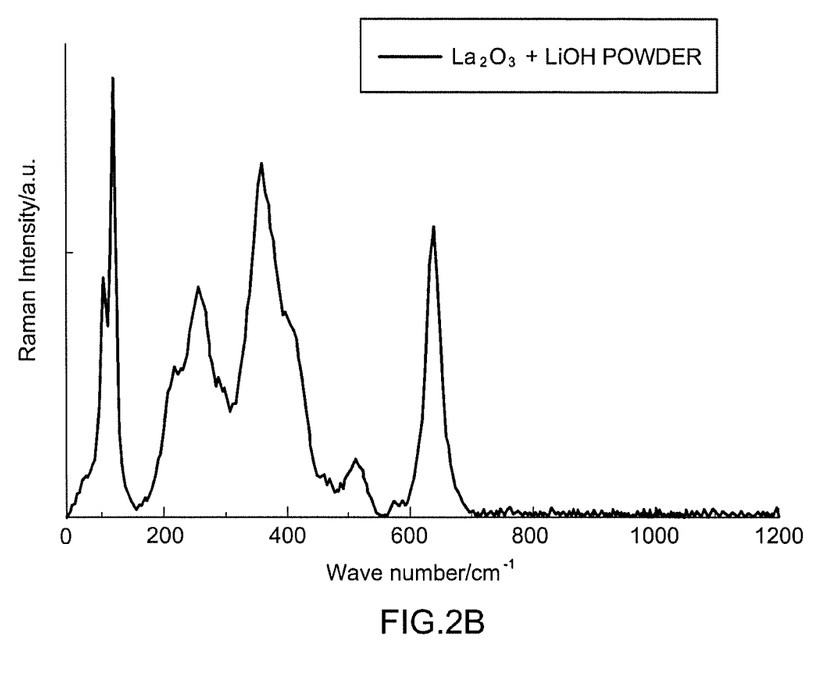
FIG. 2B is a Raman measurement result of garnet powder manufactured in Comparative Example 1 of the present disclosure.
Figure 2C:
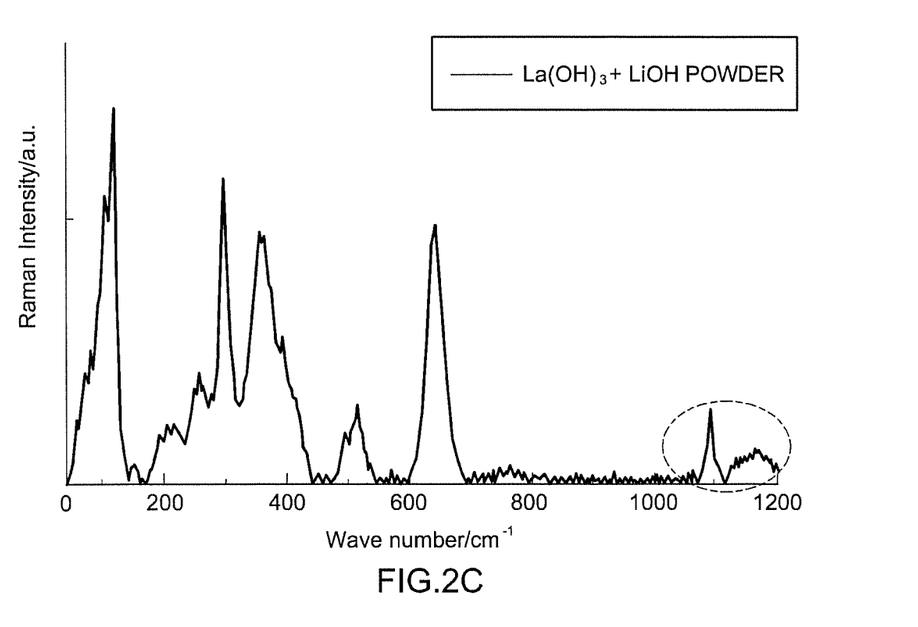
FIG. 2C is a Raman measurement result of garnet powder manufactured in Comparative Example 2 of the present disclosure.
Figure 2D:
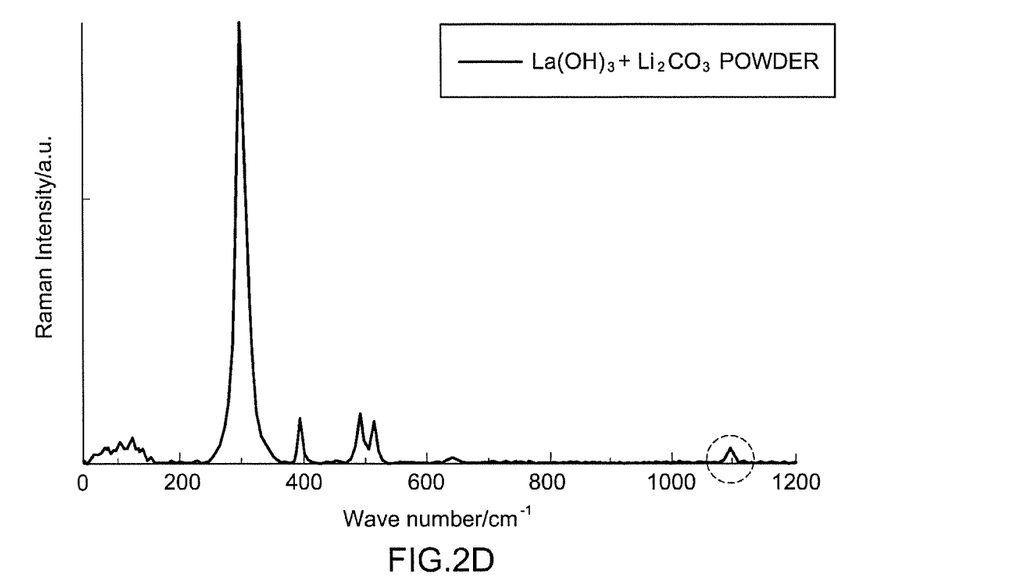
FIG. 2D is a Raman measurement result of garnet powder manufactured in Comparative Example 3 of the present disclosure.

FIG. 2A shows the Raman measurement result of the garnet powder manufactured in Example 1, FIG. 2B shows the Raman measurement result of the garnet powder manufactured in Comparative Example 1, and FIG. 2C shows the Raman measurement result of the garnet powder manufactured in Comparative Example 2. In addition, FIG. 2D shows the Raman measurement result of the garnet powder manufactured in Comparative Example 3.

As identified in FIGS. 2A to 2D, the appearance of impurity peaks instead of the cubic garnet peaks was identified in Comparative Examples 2 and 3 while only cubic garnet peaks were observed in Comparative Example 1, and it was identified that, in Example 1, the formed graph was from cubic garnet although a small amount of impurities was observed.

Test Example 3: Inductively Coupled Plasma Mass Spectrometry (ICP-MS) Measurements of Garnet Powder Manufactured in Example 1 and Comparative Examples 1 to 3

Figure 3:
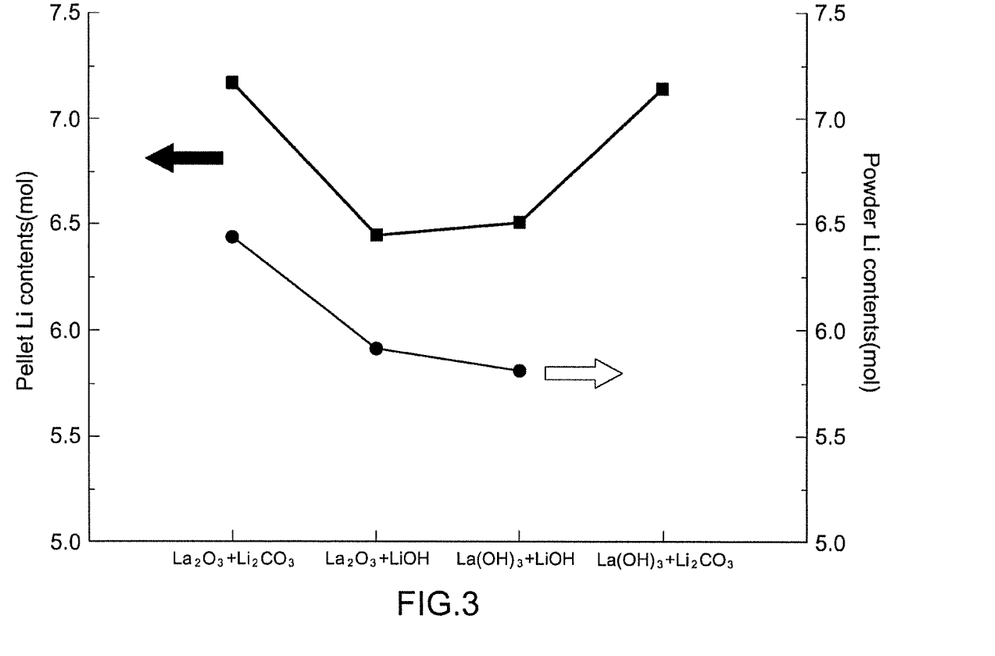
FIG. 3 shows ICP measurement results of garnet powder manufactured in Example 1 and Comparative Examples 1 to 3 of the present disclosure.
Figure 4:
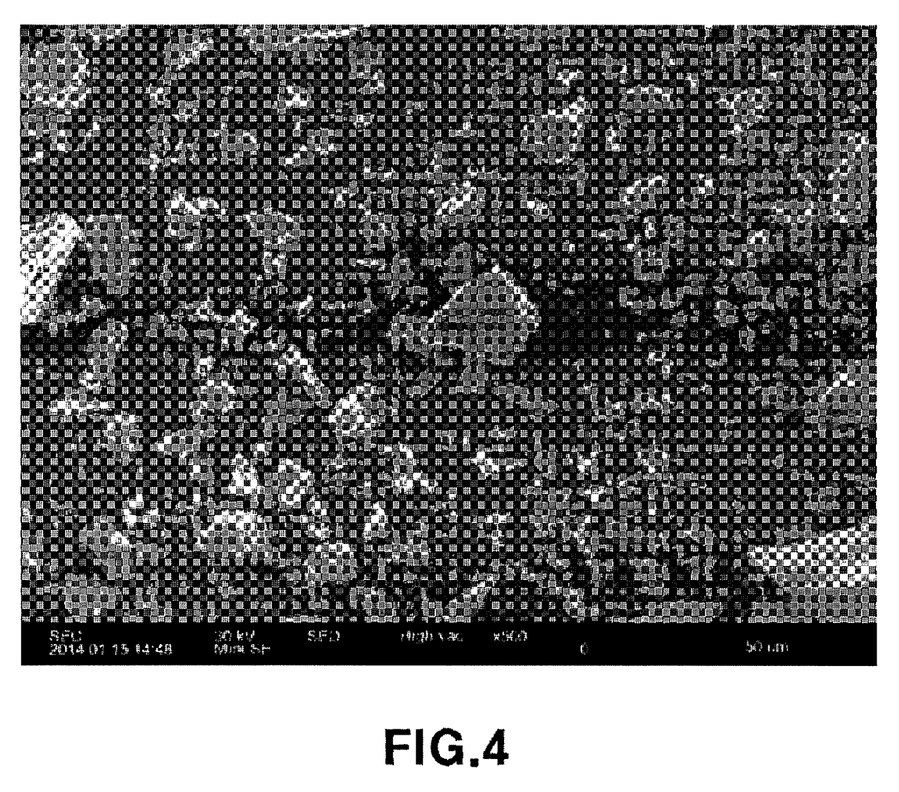
FIG. 4 is an SEM picture of garnet powder manufactured in Example 1 of the present disclosure.

In order to identify the lithium content (mol) of the garnet powder manufactured in Example 1 and Comparative Examples 1 to 3, analysis was carried out using an ICP-MS device, and the results are shown in FIGS. 3 and 4.

FIG. 3 shows the ICP measurement results of the garnet powder manufactured in Example 1 and Comparative Examples 1 to 3. It was identified that, in the garnet synthesis, an impurity phase was formed when Li is included in 6 mol or less, therefore, the example including $La_2O_3$ and $Li_2CO_3$ with 6 mol or higher of Li forming a stable garnet phase was advantageous in the garnet powder process.

FIG. 4 is an SEM picture of the garnet powder manufactured in Example 1. As shown in FIG. 4, the formation of the garnet powder having particle sizes of a few to tens of μm was identified.

In conclusion, based on the XRD, the Raman and the ICP analysis results carried out in Text Examples 1 to 3, it was demonstrated that the garnet powder of Example 1 including $La_2O_3$ and $Li_2CO_3$ is advantageous.

Test Example 4: Density and Ionic Conductivity Measurements of Garnet Powder Manufactured in Example 2 and Comparative Examples 4 to 6

The density and the ionic conductivity of the garnet powder manufactured in Example 2 and Comparative Examples 4 to 6 were measured, and the results are shown in the following Table 1.

TABLE 1

| Category | Density (%) | Ionic conductivity (S/cm) |
|---|---|---|
| Example 2 | 98 | $8.7 \times 10^{-4}$ |
| Comparative Example 4 | 82 | $9.1 \times 10^{-6}$ |
| Comparative Example 5 | 93 | $7.3 \times 10^{-5}$ |
| Comparative Example 6 | 85 | $1 \times 10^{-4}$ |

As shown in Table 1, it was identified that the garnet manufactured in Example 2 had significantly superior density and ionic conductivity compared to the garnet manufactured in Comparative Examples 4 to 6. Particularly, the ionic conductivity in Example 2 carrying out the hot press process at 1100° C. was superior to the ionic conductivity in Comparative Examples 4 and 5 carrying out the hot press process at temperatures of 900° C. and 1000° C.

Figure 5:
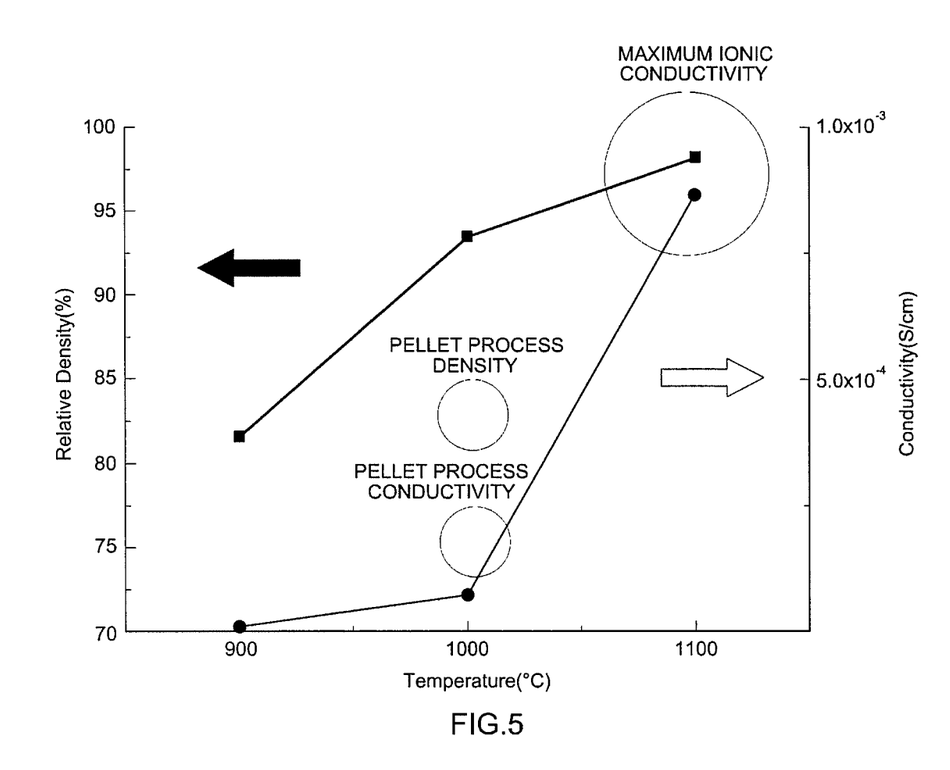
FIG. 5 is a graph showing density and ionic conductivity of solid electrolyte sheets prepared in Example 2 and Comparative Examples 4 and 5 of the present disclosure.

FIG. 5 is a graph showing the density and the ionic conductivity of the solid electrolyte sheet manufactured in Example 2 and Comparative Examples 4 and 5. As identified in FIG. 5, it was seen that general relative density when the pellet was prepared and then calcinated was approximately 85%, and the ionic conductivity was approximately $1 \times 10^{-4}$ S/cm. Meanwhile, in the hot press process using the garnet powder, the density increased as the process temperature increased, and the ionic conductivity also increased as well. Consequently, it was identified that maximum ionic conductivity was obtained in Example 2 carrying out the hot press process at a temperature of 1100° C. However, at process temperatures of 1250° C. or higher, an impurity phase may be formed or some of the garnet powder may be melted.

Test Example 5: X-Ray Diffraction (XRD) Measurements of Garnet Powder Manufactured in Examples 1 and 2, and Comparative Examples 4 and 5

Figure 6:
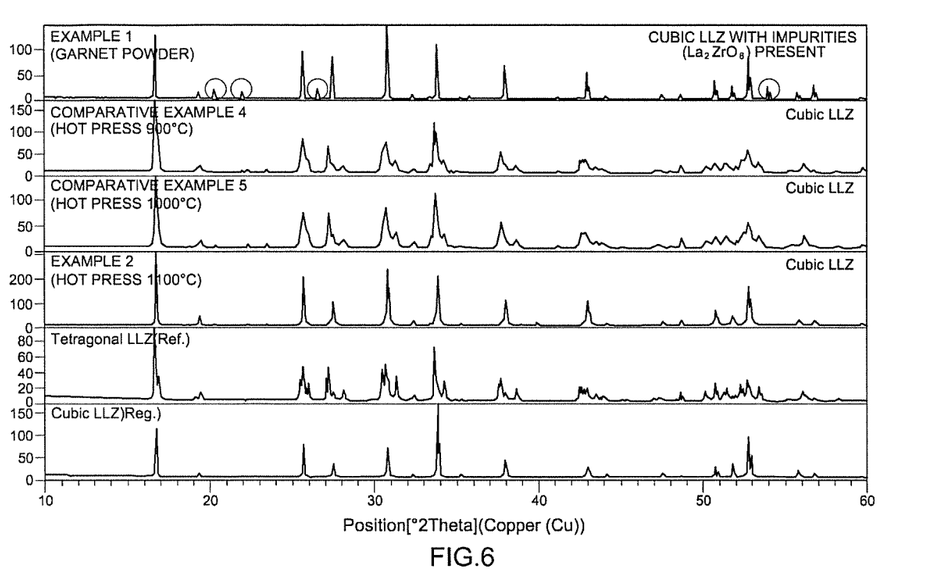
FIG. 6 is XRD measurement results of solid electrolyte sheets prepared in Examples 1 and 2 and Comparative Examples 4 and 5 of the present disclosure.

In order to identify the particle crystallizability and the presence of impurities of the garnet powder manufactured in Examples 1 and 2, and Comparative Examples 4 and 5, peaks were analyzed using an XRD device, and the results are shown in FIG. 6.

FIG. 6 shows the XRD measurement results of the solid electrolyte sheet manufactured in Examples 1 and 2, and Comparative Examples 4 and 5. As identified in FIG. 6, it was seen that the garnet powder manufactured in Example 1 had a cubic phase with a small amount of impurities present. Meanwhile, it was identified that the solid electrolyte sheet manufactured in Comparative Examples 4 and 5 carrying out a hot press had a cubic phase with low crystallizability, and the solid electrolyte sheet manufactured in Example 2 had a pure cubic phase with high crystallizability. Based on the above observation, it was identified that the impurities present in the garnet powder manufactured in Example 1 were removed through the hot press process.

Test Example 6: Raman Spectroscopy Measurements of Garnet Powder Manufactured in Example 2, and Comparative Examples 4 and 5

In order to identify the crystal phase and the impurities of the garnet powder manufactured in Example 2 and Comparative Examples 4 and 5, peaks were analyzed using a Raman Spectroscopy device, and the results are shown in FIGS. 7 and 8A-8C.

Figure 7A:
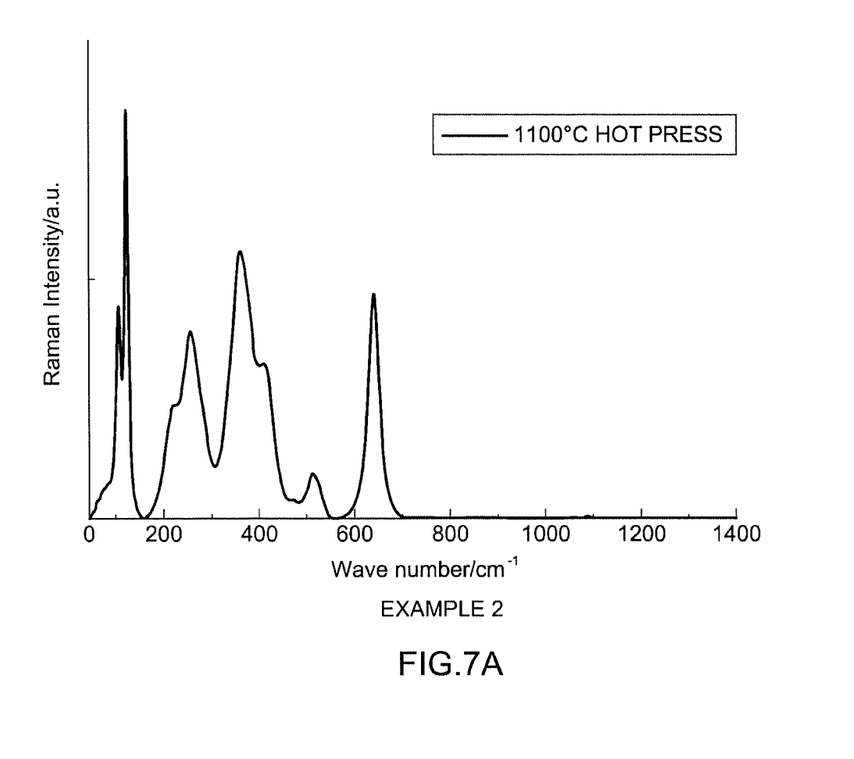
FIGS. 7A-7C are Raman measurement results of solid electrolyte sheets prepared in Example 2 and Comparative Examples 4 and 5 of the present disclosure.
Figure 7B:
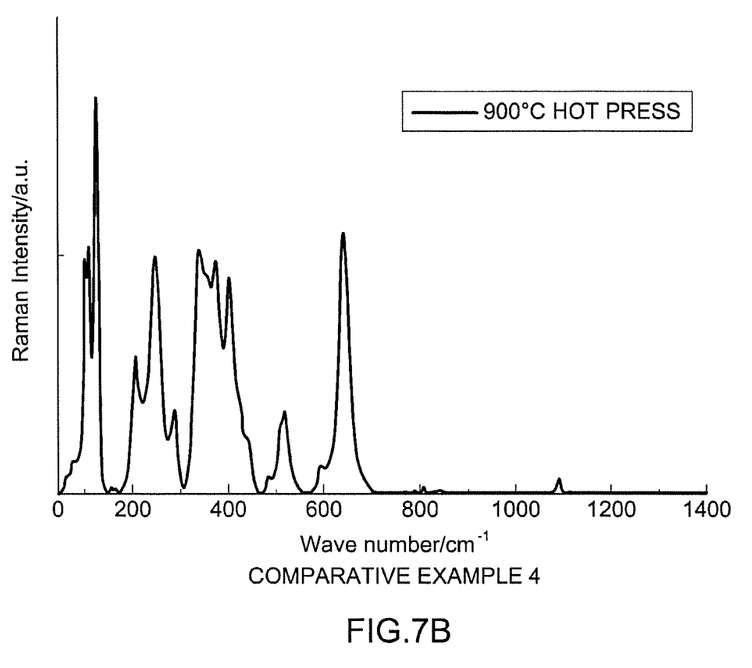
Figure 7C:
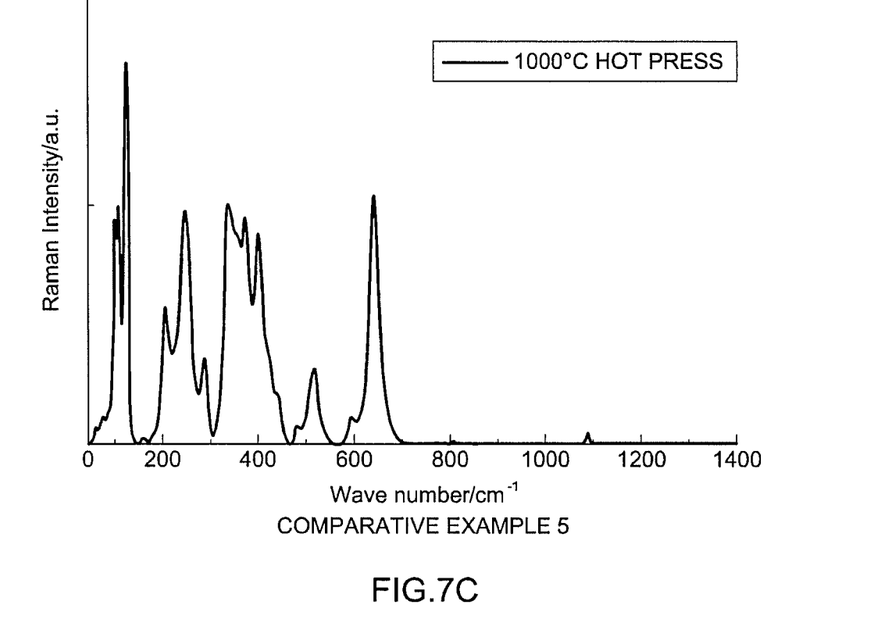

FIGS. 7A-7C show the Raman measurement results of the solid electrolyte sheet manufactured in Example 2 and Comparative Examples 4 and 5. As identified in FIGS. 7A-7C, a tetragonal phase and a cubic phase were mixed in the solid electrolyte sheet manufactured in Comparative Examples 4 and 5, and impurity peaks were observed. Meanwhile, only cubic-phased peaks were observed in Example 2.

Figure 8A:
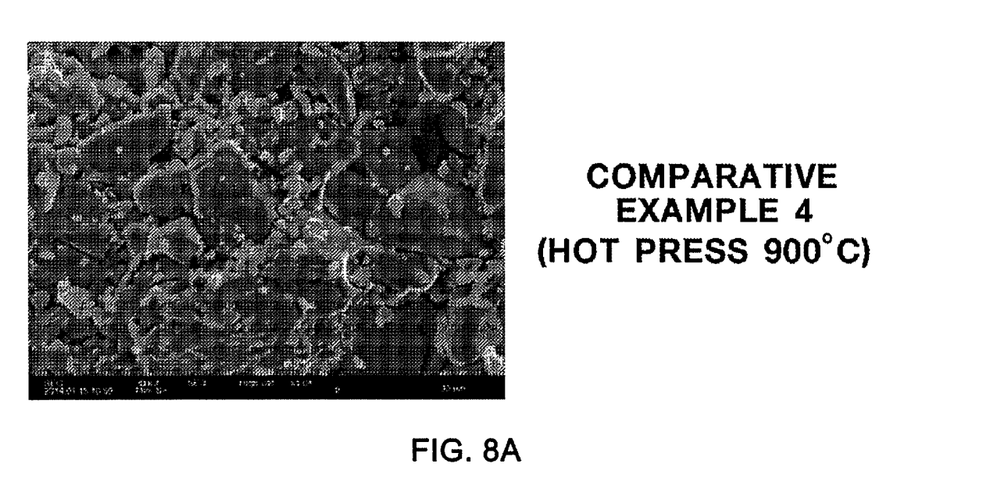
FIGS. 8A-8C are SEM pictures of solid electrolyte sheets prepared in Example 2 and Comparative Examples 4 and 5 of the present disclosure.
Figure 8B:
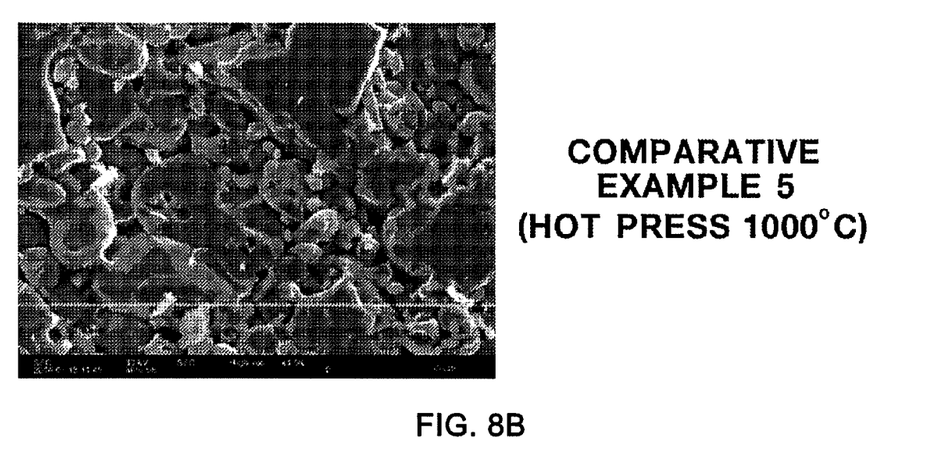
Figure 8C:
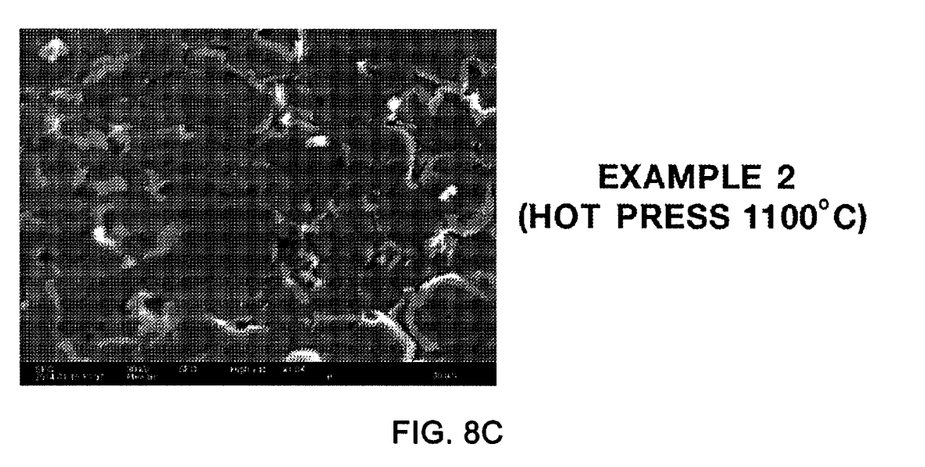

FIGS. 8A-8C are SEM pictures of the solid electrolyte sheet manufactured in Example 2 and Comparative Examples 4 and 5. As identified in FIGS. 8A-8C, it was seen that the size of the particles increased as the temperature of the hot press process increased, and closed pores were observed in Example 2 carrying out the process at 1100° C., and this was a phenomenon due to particle growth. Based on the above observation, it was identified that grain boundary resistance decreased as the particle sizes of the material increased inducing the increase of ionic conductivity.

Consequently, it was identified that the content of the LLZ ($Li_7La_3Zr_2O_{12}$) garnet powder obtained according to the present disclosure is high, and the garnet powder has a cubic-phased crystal structure with high crystallizability, and by using a hot press process, the solid electrolyte sheet using the garnet powder has a pure cubic-phased crystal structure without impurities, and has improved ionic conductivity compared to existing solid electrolytes.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A method for manufacturing a solid electrolyte sheet using a hot press, the method comprising:
preparing a garnet powder having a cubic-phased crystal structure,
wherein the garnet powder includes Li, La and Zr;
wherein the molar ratio of Li:La:Zr in the garnet powder is 6.5 to 8.3:3:2;
wherein some of the Li in the garnet powder is substituted with Al; and
wherein the Al is substituted in a range of 0.02 to 1.075 mol;

manufacturing a solid electrolyte sheet by hot pressing the garnet powder for 30 minutes to 2 hours in a temperature range of 1050 to 1250° C. under an oxygen free atmosphere.

2. The method for manufacturing a solid electrolyte sheet of claim 1, wherein a thickness of the solid electrolyte sheet ranges from 0.01 to 5 mm.

3. The method for manufacturing a solid electrolyte sheet of claim 1, wherein ionic conductivity of the solid electrolyte sheet ranges from $6\times10^{-4}$ to $10\times10^{-4}$ S/cm.

4. The method for manufacturing a solid electrolyte sheet of claim 1, further comprising analyzing the solid electrolyte sheet, wherein the analysis is carried out using X-Ray Diffraction (XRD), Raman Spectroscopy, or Inductively Coupled Plasma Mass Spectrometry (ICP-MS).

* * * * *